United States Patent
Ficyk et al.

(10) Patent No.: US 6,223,622 B1
(45) Date of Patent: May 1, 2001

(54) PUSH BUTTON CABLE ACTUATOR

(75) Inventors: Eugene J. Ficyk, Livonia; David Van Zanten, Troy; Michael J. Konn, Utica, all of MI (US)

(73) Assignee: L&P Property Management Company, Southgate, CA (US)

( * ) Notice: Subject to any disclaimer, the term of this patent is extended or adjusted under 35 U.S.C. 154(b) by 0 days.

(21) Appl. No.: 09/489,866

(22) Filed: Jan. 21, 2000

(51) Int. Cl.$^7$ .................................................... F16C 1/16
(52) U.S. Cl. ............................................. 74/502; 74/501.6
(58) Field of Search ................................. 74/501.6, 502, 74/500.5, 501.5 R, 502.4, 502.6

(56) References Cited

U.S. PATENT DOCUMENTS

| | | | |
|---|---|---|---|
| 2,389,259 | 11/1945 | Horlacher | 74/503 |
| 2,602,179 | 7/1952 | Biraben | 15/253 |
| 2,869,391 | 1/1959 | Brock | 74/503 |
| 3,348,427 | 10/1967 | Wilkey | 74/502 |
| 3,348,428 | 10/1967 | Shaeffer | 74/502 |
| 3,429,197 | 2/1969 | Loewenstern | 74/502 |
| 3,584,518 | 6/1971 | Hurlow | 74/501 |
| 3,587,341 | 6/1971 | Fiddler | 74/501 |
| 3,589,209 | 6/1971 | Howell | 74/501 |
| 3,653,277 | 4/1972 | Gilmore | 74/502 |
| 3,732,748 | 5/1973 | Cavalli | 74/502 |
| 3,827,313 | 8/1974 | Kiessling | 74/471 XY |
| 3,990,321 | 11/1976 | Hurlow | 74/501 R |
| 4,050,327 | 9/1977 | Thomas et al. | 74/502 |
| 4,161,993 | 7/1979 | Pitrat | 180/90 |
| 4,611,502 | 9/1986 | Gregory | 74/502 |
| 4,633,724 | 1/1987 | Mochida | 74/471 R |
| 4,807,852 | 2/1989 | Ottemann et al. | 254/290 |
| 4,875,384 | 10/1989 | Hirayama et al. | 74/500.5 |
| 4,898,039 | 2/1990 | Aiyama et al. | 74/6 |
| 4,957,017 | 9/1990 | Corbett | 74/502.4 |
| 4,970,912 | 11/1990 | Wolf | 74/501.6 |
| 5,010,780 | 4/1991 | Hatfield | 74/501.5 R |
| 5,036,725 | 8/1991 | Troiano | 74/500.5 |
| 5,174,170 | 12/1992 | Kato et al. | 74/502.6 |
| 5,261,293 | 11/1993 | Kelley | 74/502.6 |
| 5,270,505 | 12/1993 | Magiera | 200/331 |
| 5,295,408 | 3/1994 | Nagle et al. | 74/502.6 |
| 5,435,202 | 7/1995 | Kitamura | 74/502.4 |
| 5,522,276 | 6/1996 | Lichtenberg | 74/500.5 |
| 5,584,212 | 12/1996 | Wild | 74/502.6 |
| 5,605,213 | 2/1997 | White | 192/82 R |
| 5,653,148 | 8/1997 | Reasoner | 74/502.4 |
| 5,662,195 | 9/1997 | Rush | 192/3.51 |
| 5,664,461 | 9/1997 | Kitamura | 74/502.4 |
| 5,706,705 | 1/1998 | Stringer | 74/502 |
| 5,706,706 | 1/1998 | Kitamura | 74/502.4 |
| 5,823,620 | 10/1998 | Le Caz | 297/284.4 |
| 5,842,382 | 12/1998 | Gabas | 74/501.5 R |
| 5,850,763 | 12/1998 | Kitamura | 74/502.4 |
| 5,913,944 | 6/1999 | Haynes et al. | 74/502.6 |

*Primary Examiner*—Mary Ann Green
(74) *Attorney, Agent, or Firm*—Thompson Coburn LLP; Grant D. Kang; Robert C. Haldiman

(57) ABSTRACT

A push button actuator including a plunger movable between return and actuating positions, a flexible conduit with an axial bore therethrough and a flexible core slideably disposed within the bore. The first end of the conduit is operatively connected to the plunger and moves substantially with the plunger. The second end of the conduit and the first end of the core are fixed with respect to the movement of the plunger between its return and activating positions. Movement of the plunger from its return position to its actuating position pushes the first end of the conduit away from the first end of the core, flexing the conduit and causing the second end of the core to be drawn towards the second end of the conduit. The movement of the second end of the core may be used to activate a reaction mechanism operatively connected to the second end of the core.

15 Claims, 5 Drawing Sheets

PUSH BUTTON CABLE ACTUATOR

BACKGROUND OF THE INVENTION

The present invention relates to the field of cable actuators for remotely activating a reaction mechanism.

DESCRIPTION OF THE DRAWINGS

Similar reference characters refer to similar elements and characteristics throughout the various figures.

BRIEF DESCRIPTION OF THE INVENTION

The present invention is a push button actuator including a plunger movable between return and actuating positions, a flexible conduit with an axial bore therethrough and a flexible core slideably disposed within the bore. The first end of the conduit is operatively connected to the plunger and moves substantially with the plunger. The second end of the conduit and the first end of the core are fixed with respect to the movement of the plunger between its return and activating positions. Movement of the plunger from its return position to its actuating position pushes the first end of the conduit away from the first end of the core, flexing the conduit and causing the second end of the core to be drawn towards the second end of the conduit. The movement of the second end of the core may be used to activate a reaction mechanism operatively connected to the second end of the core.

DETAILED DESCRIPTION OF THE PREFERRED EMBODIMENT AND MODES FOR CARRYING OUT THE INVENTION

Figure 1:
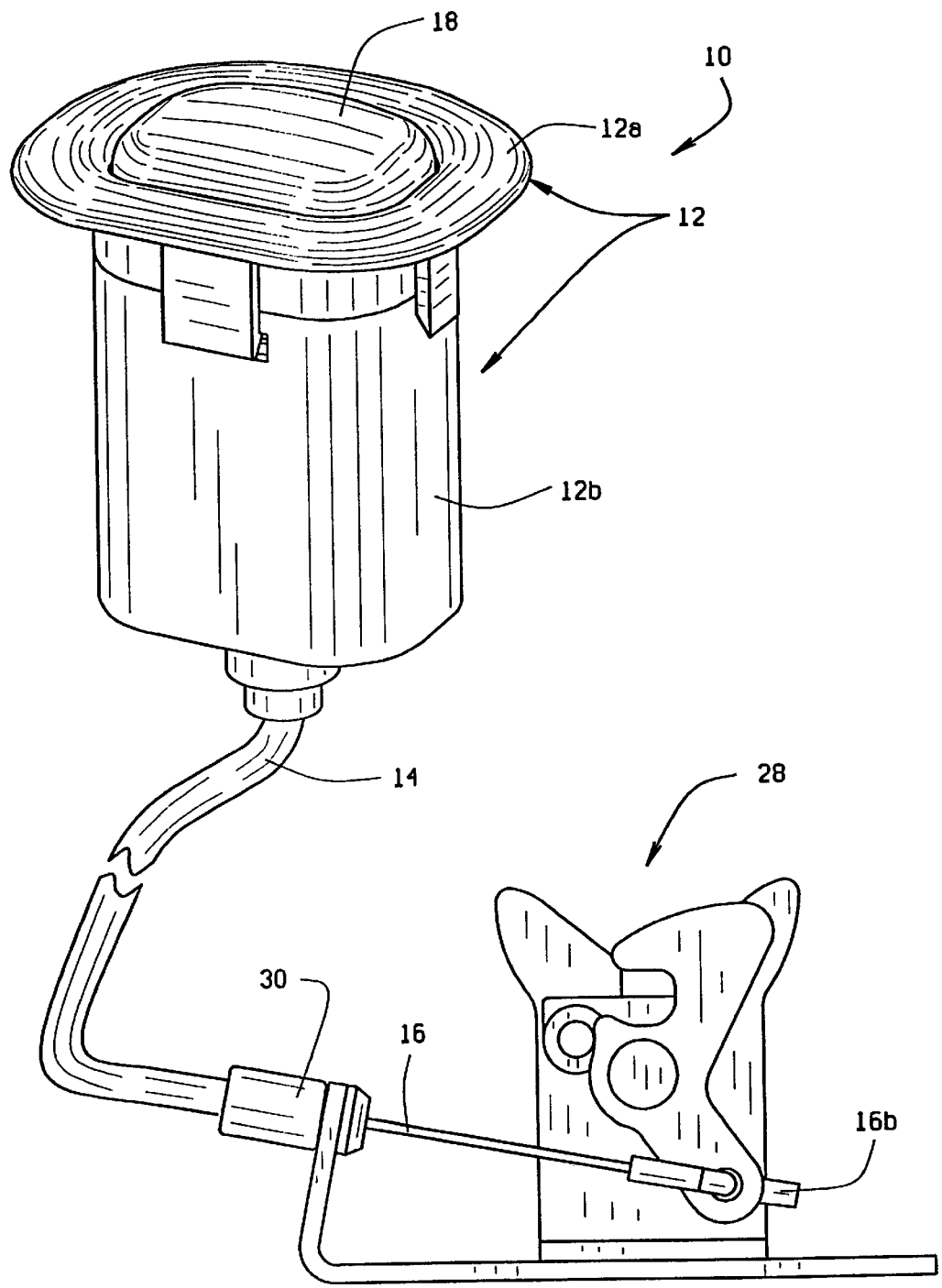
FIG. 1 shows a perspective view of a first embodiment of the present invention including a push button mechanism.
Figure 2:
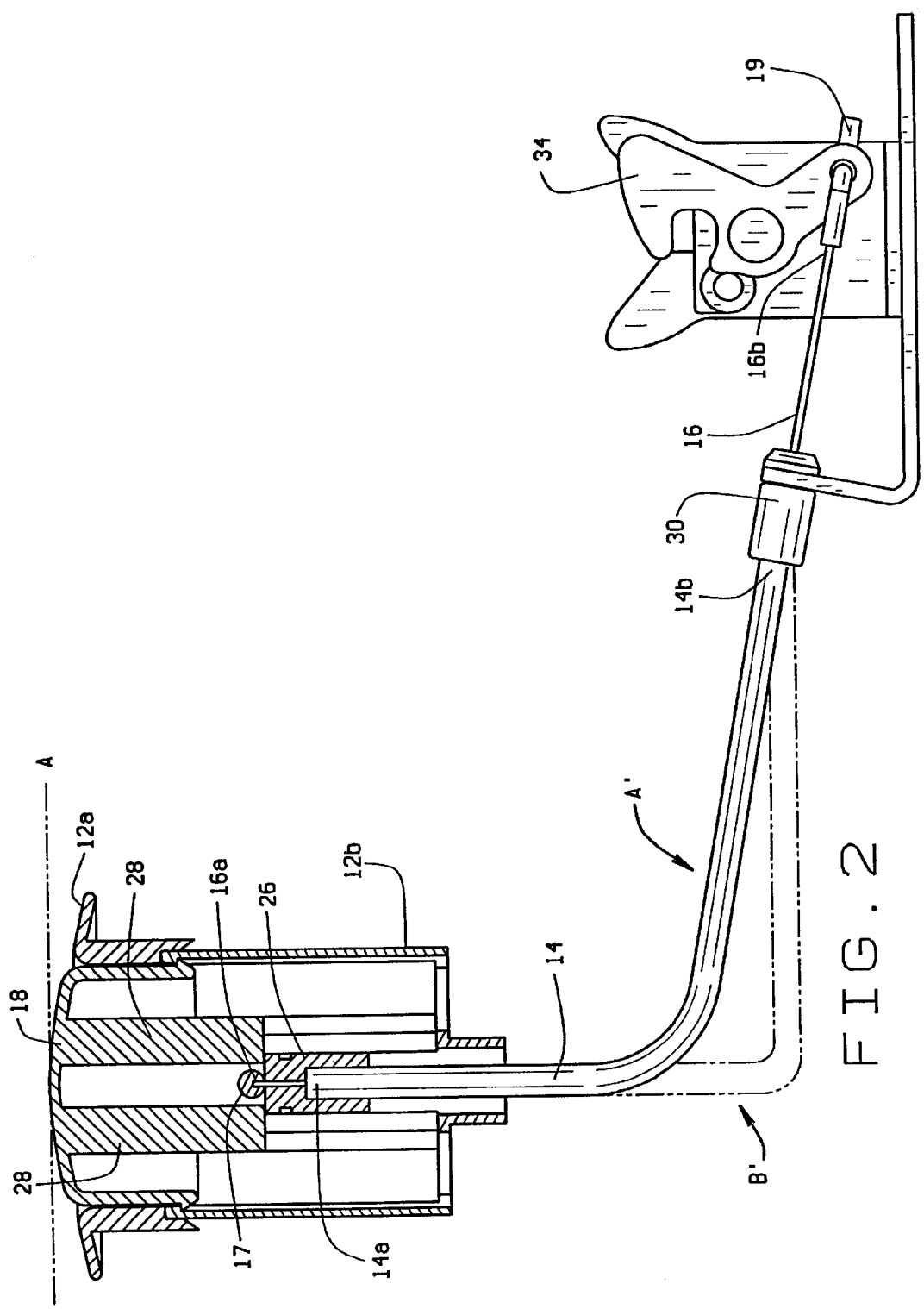
FIG. 2 shows a plan view of the first embodiment with a section view of the push button mechanism.
Figure 3:
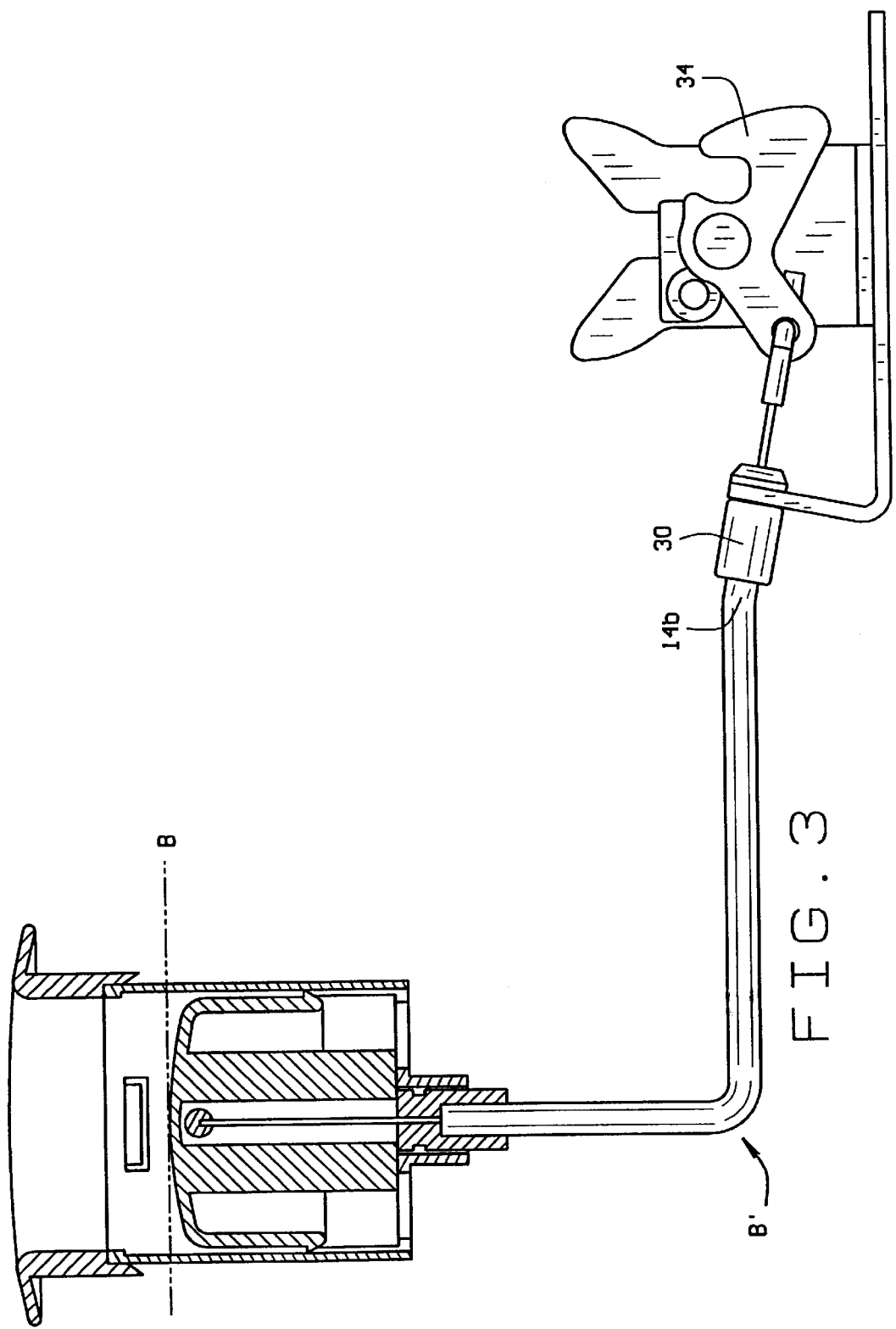
FIG. 3 shows another plan view of the first embodiment with a section view of the push button mechanism in its actuating position.

Turning to FIG. 1, a first embodiment of the present invention is shown generally as 10. In this embodiment, the push button actuator includes a housing 12, flexible conduit 14, flexible core 16, plunger 18, and a reaction mechanism 20. The conduit 14 contains an axial bore therethrough within which the flexible core 16 is slideably disposed. FIGS. 2 and 3 show cross sections of the push-button aspect of invention and further illustrate the operation of the invention.

Specifically, FIG. 2 shows the plunger 18 operatively connected to the first end 14a of the conduit 14. The plunger 18 is moveable between a return position A (FIG. 2) and an actuating position B (FIG. 3). The operative connection between the plunger 18 and the first end 14a of the conduit 14 transfers the movement of the plunger 18 to the conduit 14.

Figure 4:
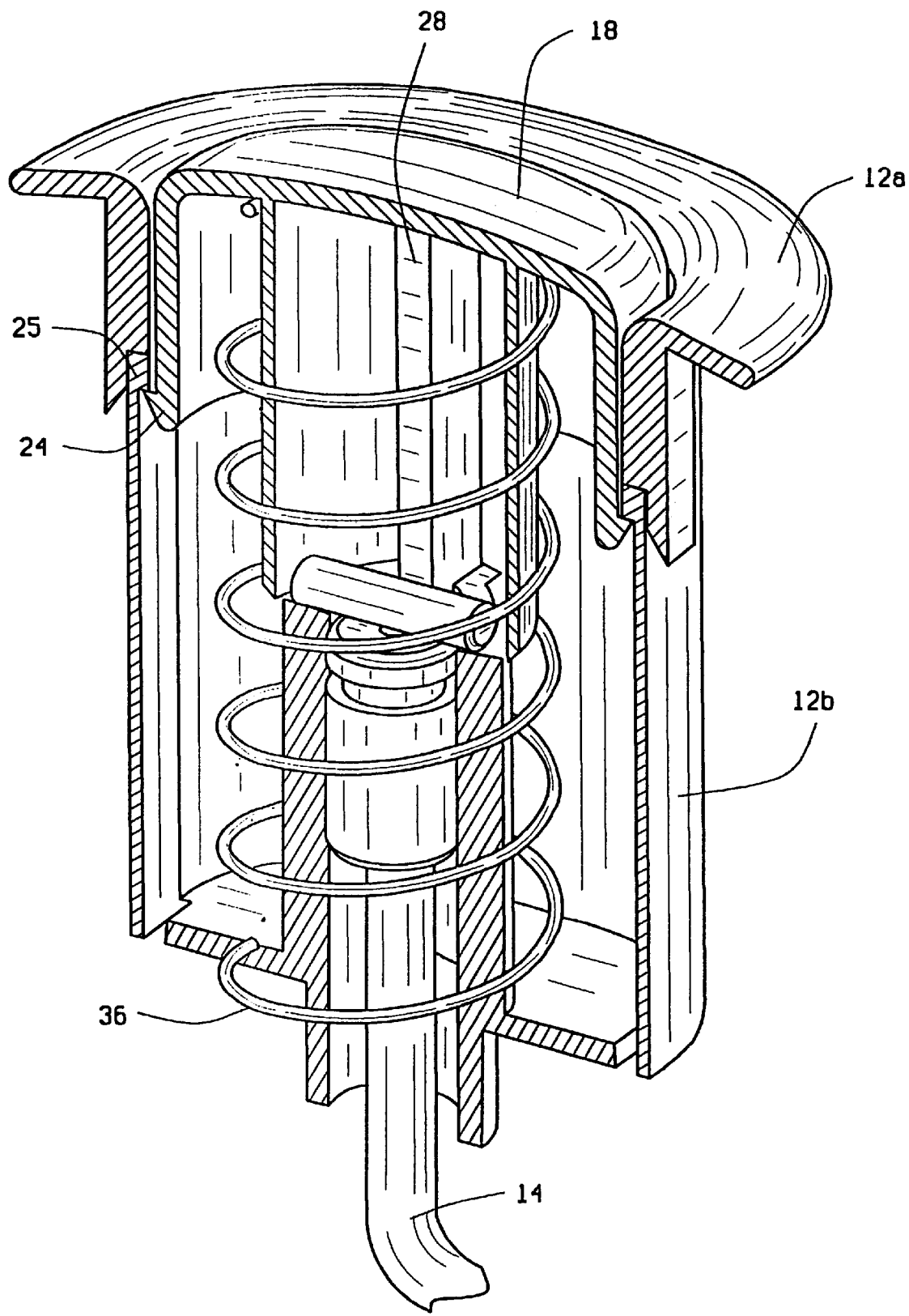
FIG. 4 shows a section view of one embodiment of the push button mechanism.
Figure 5:
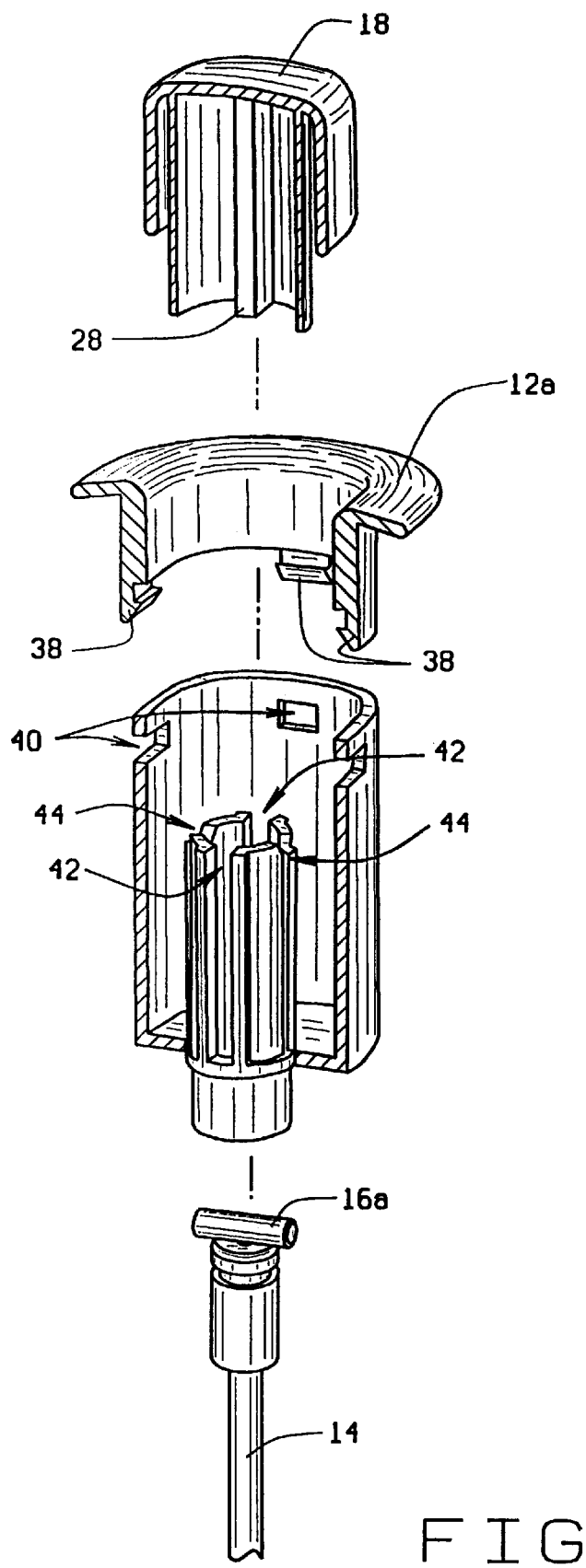
FIG. 5 shows an exploded and cut away view of one embodiment of the push button mechanism.

As shown in FIGS. 2, 4 and 5, this operative connection may be made through protuberances 28 of the plunger 18 contacting a ferrule 26 terminating the first end 14a of the conduit 14. As more clearly shown in FIGS. 4 and 5, the protuberances 28 engage slots 42 in the housing 12. The slots 42 allow the plunger 18 to engage and push the first end 14a of the conduit 14 as the plunger 18 moves between its A and B positions. Of course, this operative connection may be made in any other suitable manner as desired, including without the use of the ferrule 26 or simply by affixing the end 14a of the conduit 14 directly to the plunger 18.

In FIG. 3, the fixed position of the first end 16a of the core 16 is illustrated. As shown, the first end 16a of the core 16 is fixed with respect to the movement of the plunger 18 between its positions A and B. In other words, as the plunger 18 moves between positions A (FIG. 2) and B (FIG. 3), the first end 16a of the core 16 retains its position.

Similarly, the second end 14b of the conduit 14 is fixed with respect to the movement of the plunger 18 between its positions A and B. Because the second end 14b of the conduit 14 is fixed, as the plunger 18 moves from position A to B it pushes the first end 14a of the conduit 14 causing the conduit 14 to move and flex from its return position A' to its actuating position B'. In FIG. 2, the flexing of the conduit 14 is illustrated by a dashed representation of the conduit 14 position B'.

To compensate for the flexing of the conduit 14 within which it is disposed, the core 16 must slide within the bore of the conduit 14. Because the first end 16a of the core 16 is fixed, the flexing of the conduit 14 causes the second end 16b of the core 16 to be drawn towards the second end 14b of the conduit 14, as shown in FIG. 3.

If the second end 16b of the core 16 is operatively connected to reaction mechanism 20, the movement of the second end 16b of the core 16 may activate that mechanism 20. For example, as shown in FIGS. 2 and 3, the reaction mechanism 20 may be a latch apparatus. When the plunger 18 is moved to its actuating position B, the conduit 14 flexes into its position B' and the second end 16b of the core 16 moves towards the second end 14b of the conduit 14 as the core 16 is drawn into the second end 14b of the conduit 14. As the second end 16b of the core is pulled into the conduit 14, the latch 34 of the reaction mechanism 20 opens, as shown in FIG. 3. Of course, the reaction mechanism 20 may be any suitable type of actuable mechanism. For example, on automobiles, it may include, among other things, latch mechanisms for trunks, seat inclines, seat fold-over systems, hoods, fuel refiner hatchs, or even tilt and/or telescoping steering columns.

The present invention includes biasing element 36, shown in FIG. 4 as a spring 36. This biasing element 36, when used, urges the plunger 18 towards its return position A. As such, it may supplement the natural bias provided by the conduit's 14 inherent tendency to return to its unflexed state A'. Although only a spring is shown, other known and suitable biasing elements may be substituted, including, but not limited to, flexible plastic tabs, rubber or foam inserts, etc.

Also shown in FIG. 4 is a return position stop 24 and 25. As illustrated, one embodiment of the return position stop includes at least one engagement tooth or continuous ledge 24 on the plunger 18 which engages at least one raised stop or continuous protuberance 25 of the housing 12. In operation, the engagement of the tooth 24 with the stop 25 arrests the movement of the plunger 18 as it slides from position B to position A.

In the figures, the housing 12 is shown as a two piece element which may aid assembly of certain commercial applications of the invention. However, a single or multi-element housing may also be used, as desired. The two piece housing 12 includes a main housing 12b and a trim element 12a through which the plunger 18 is inserted and thereby at least partially enclosed within the housing 12. In one embodiment, the trim element 12a is snapped onto the main housing 12b and secured by, among other things, tab 38 and notch 40 fittings, as shown in FIG. 5.

The housing 12 may also include fittings adapted to receive and fix the first end 16a of the core 16. As shown in FIG. 5, in one embodiment, these fittings may be indentations 44 adapted to receive and fix a core terminator 17 at the first end 16a of the core 16.

Throughout this specification, various known conduit and core terminations have been used and illustrated. For example, the conduit 14 is shown terminated at both its first 14a and second 14b ends by ferrules 26 and 30, respectively. Also, the first 16a and second 16b ends of the core 16 are shown terminated in fittings 17 and 19 adapted to fit the indentations 44 and the reaction fitting 20, respectfully. These terminations are optional and variable as they may be dispensed with completely or adapted as necessary for a specific application.

The embodiments and specification described above are only illustrative and cannot be construed as limiting the scope of the present invention as claimed herein.

What is claimed is:

1. A push button cable actuator comprising:
   a plunger moveable between return and actuating positions;
   a flexible conduit having an axial bore therethrough and first and second ends; and
   a flexible core slideably disposed within said axial bore and having first and second ends;
      wherein said first end of said conduit is operatively connected to said plunger and moves substantially with said plunger between its return and actuating positions;
      wherein said second end of said conduit is fixed with respect to the movement of said plunger;
      wherein said first end of said core is fixed with respect to the movement of said plunger between its return and actuating positions.

2. The push button cable actuator of claim 1 further comprising a reaction mechanism operatively connected to said second end of said core.

3. The push button cable actuator of claim 1 further comprising a housing wherein said plunger is moveably disposed within said housing and said first end of said core is connected to said housing.

4. The push button cable actuator of claim 1 further comprising a biasing element which biases said plunger to its return position and at least aids in the return of said plunger to its return position from its actuating position.

5. The push button cable actuator of claim 1 further comprising a biasing means for biasing said plunger to its return position and at least aiding in the return of said plunger to its return position from its actuating position.

6. The push button cable actuator of claim 1 further comprising a return position stop in operative connection with said plunger to stop the movement of said plunger in its return position as said plunger moves from its actuating position to its return position.

7. The push button cable actuator of claim 1 further comprising a means for stopping the movement of said plunger at its return position as said plunger moves from its actuating position to its return position.

8. The push button cable actuator of claim 2 wherein said reaction mechanism is a latch.

9. The push button cable actuator of claim 2 wherein said reaction mechanism is a trunk release mechanism.

10. The push button cable actuator of claim 2 wherein said reaction mechanism is a seat back recline mechanism.

11. The push button cable actuator of claim 2 wherein said reaction mechanism is an automobile fuel refiller-cover release mechanism.

12. The push button cable actuator of claim 2 wherein said reaction mechanism is a rear seat fold-over mechanism.

13. The push button cable actuator of claim 2 wherein said reaction mechanism is a steering wheel tilt release mechanism.

14. The push button cable actuator of claim 3 wherein said housing includes a trim element and a main housing wherein said plunger may be inserted in said trim element and said trim element may be secured to said main housing to at least partially enclose said plunger within said housing.

15. The push button cable actuator of claim 4 wherein said biasing element is a spring.

* * * * *